UNITED STATES PATENT OFFICE.

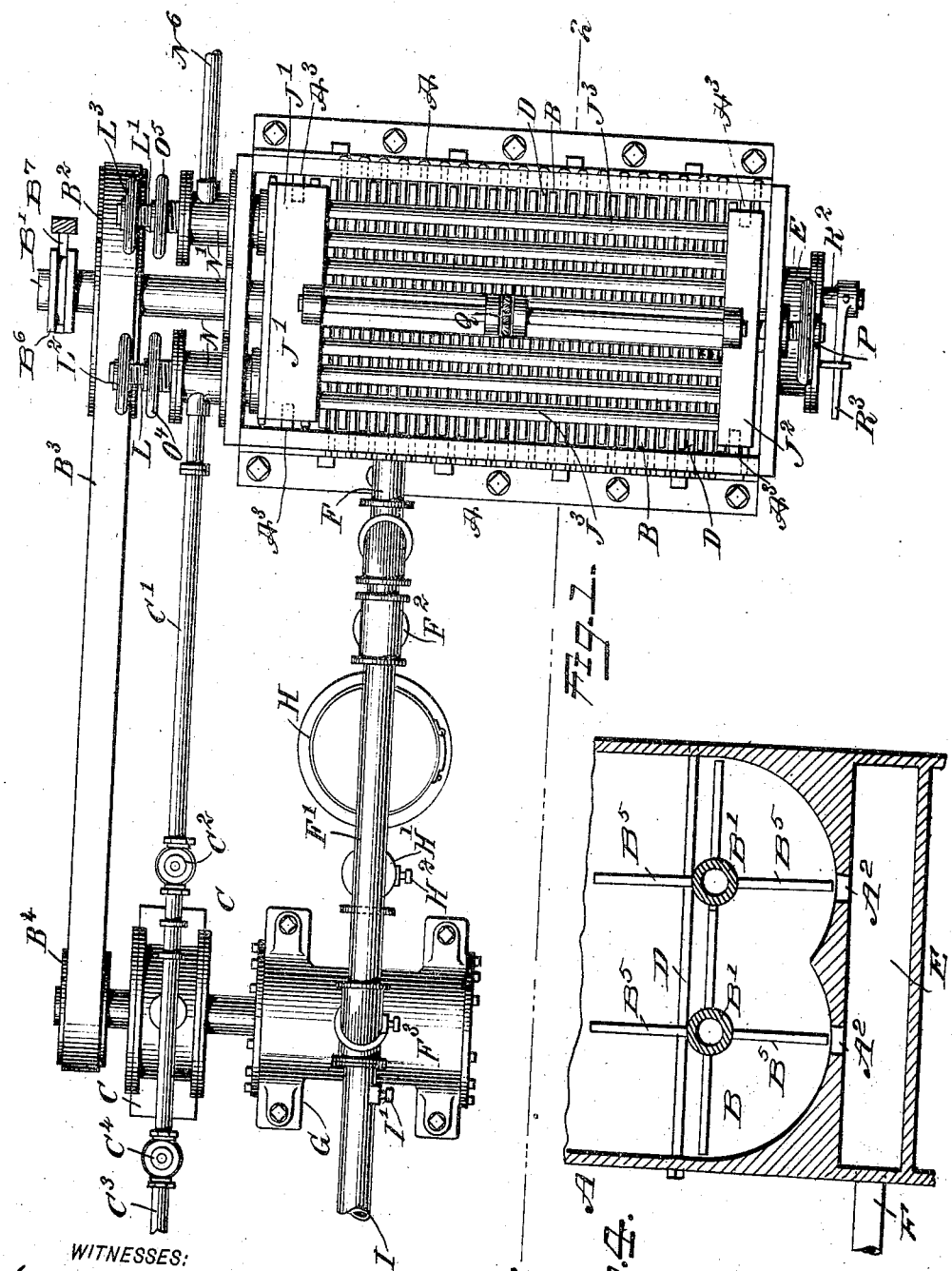

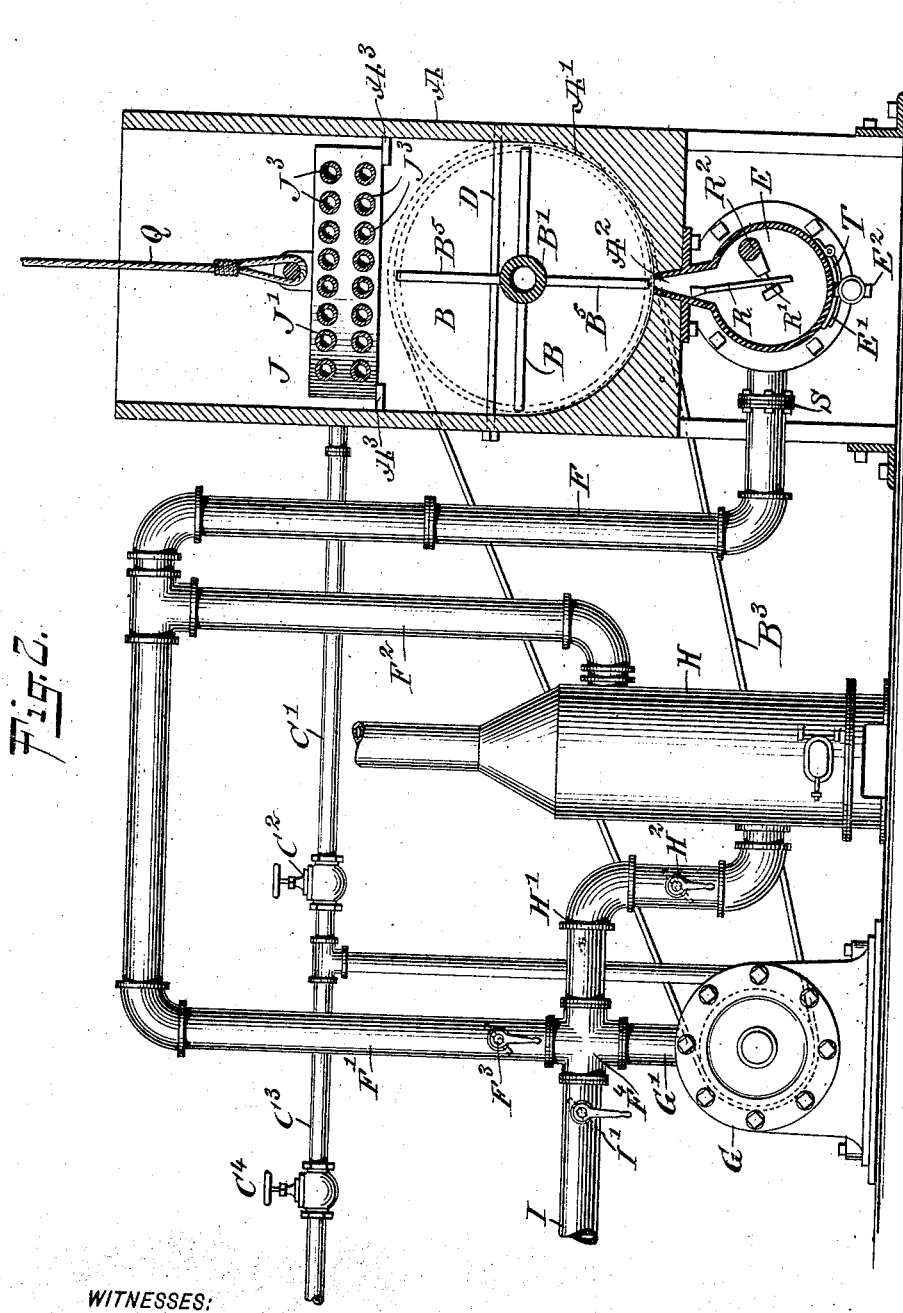

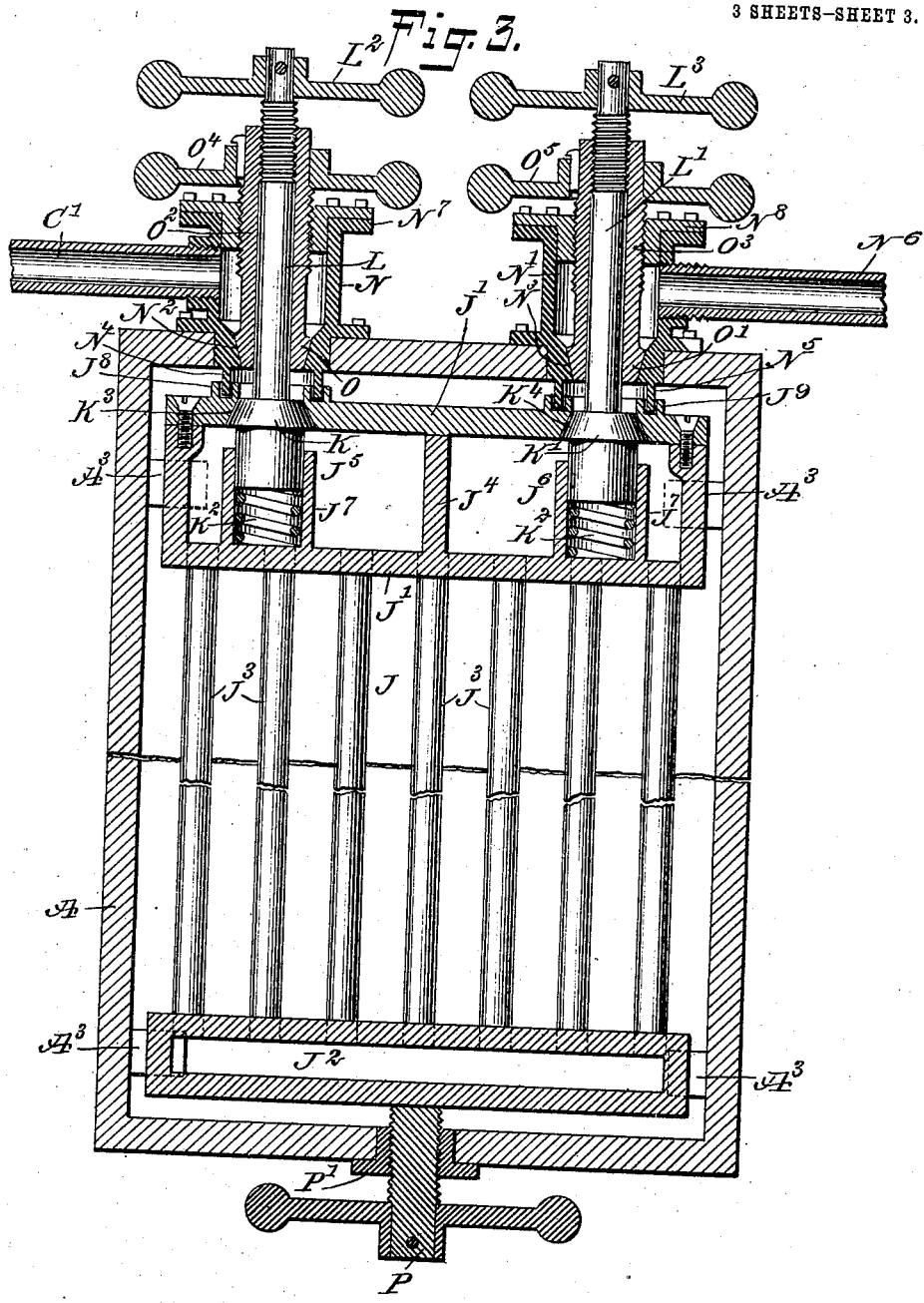

JOHN McINTYRE, OF JERSEY CITY, NEW JERSEY, ASSIGNOR, BY MESNE ASSIGNMENTS, TO WATKIN M. GRIFFITH, OF FREEPORT, LONG ISLAND, NEW YORK.

APPARATUS FOR DRYING MILK.

1,026,757.     Specification of Letters Patent.     Patented May 21, 1912.

Continuation of application Serial No. 162,032, filed June 18, 1903. Renewed May 10, 1904, Serial No. 259,828. This application filed October 30, 1905, Serial No. 285,174. Renewed October 11, 1911. Serial No. 654,165.

*To all whom it may concern:*

Be it known that I, JOHN McINTYRE, a citizen of the United States, and a resident of Jersey City, in the county of Hudson and State of New Jersey, have invented a new and Improved Apparatus for Drying Milk, of which the following is a full, clear, and exact description.

The invention relates to the extraction of the aqueous portion of milk and other liquids and substances until dry solids are obtained.

The object of the invention is to provide a new and improved apparatus for drying milk and the like, arranged to insure the production of separate solid particles of the milk in a very economical manner and without danger of spoiling the batch or injuring the product, by rendering the non-fatty solids insoluble, thus allowing reconstruction of the milk by dissolving the product in water under the application of heat, to obtain a solution akin to natural normal milk.

The invention consists of novel features and parts and combinations of the same, as will be more fully described hereinafter and then pointed out in the claims.

A practical embodiment of the invention is represented in the accompanying drawings forming a part of this specification, in which similar characters of reference indicate corresponding parts in all the views.

Figure 1 is a plan view of the improvement; Fig. 2 is a sectional side elevation of the same, on the line 2—2 of Fig. 1; Fig. 3 is an enlarged sectional plan view of the vessel or tank and the milk heating coil, and Fig. 4 is a sectional side elevation of a modified form of the improvement.

The vessel or tank A for containing the milk to be treated is preferably of rectangular shape, open at the top and provided with a semi-circular bottom A', having an air induction port A², preferably extending throughout the length of the bottom and preferably at the lowest portion thereof, the said air induction port serving for introducing heated air under pressure into the milk contained in the vessel or tank A. In the bottom portion of the vessel A is mounted to turn a breaker, agitator or stirrer B, having its shaft B', journaled in suitable bearings in the ends of the vessel A, and on the outer end of the shaft B' is secured a pulley B², connected by a belt B³ with a pulley B⁴, on the main shaft of an engine C or other motor, for imparting a rotary motion to the said agitator B, to agitate the milk and the air passing into the milk, as above described.

The apparatus has been used for years, and it is found that by the air entering the vessel in an uninterrupted sheet at the bottom and having the wings of the stirrer close to the half-round bottom of the vessel, the air is so thoroughly and quickly mixed with the milk and both are broken up to insure a ready evaporation and without coagulation of the albumin. This actual practical use of the invention has demonstrated the importance of the slotted construction of the bottom of the vessel, as well as such construction in connection with the stirrer arranged and operating as described, and the actual use of the machine has been carried on to such extent as to demonstrate that the desired results cannot be secured by any construction of the bottom differing from that of the slotted form shown and described.

The agitator B is preferably provided with radial spokes or arms B⁵, sweeping with their outer ends the surface of the semi-circular bottom A', and the agitator B is capable of an endwise bodily movement, for the end spokes to alternately sweep the inner surface of the ends of the vessel, and the ends of the spokes to sweep the bottom of the vessel, and thereby prevent adherence of the milk to the inner surface of the bottom portion of the tank or vessel A.

In order to keep the arms B⁵ of the agitator or stirrer B free from the milk as the latter thickens, scrapers or intercepters D are provided, preferably in the shape of rods, extending transversely and secured in the side walls of the vessel A, the said rods extending between adjacent rows of spokes or arms B⁵, so that when the agitator B is rotated and moved lengthwise, the said arms B⁵ sweep past the intercepters and are thus freed of any milk that may adhere to the said arms.

The endwise movement of the agitator may be accomplished periodically by the operator shifting the shaft B' or by suitable mechanical means, but such, for instance, as a cam collar B⁶ on the shaft B', engaged by a fixed pin B⁷ or the like. Thus by the arrangement described, the stirrer sweeps the whole bottom and end portions of the vessel, to prevent dormancy of the milk, and the stirrer arms are kept free from milk particles. The intercepter rods may be connected with each other, to form a grate, to permit convenient removal of the same for cleaning purposes.

The air induction port A² connects with an air chamber E, bolted or otherwise secured to the under side of the vessel A, and into the said air chamber E leads an air supply pipe F, having branch pipes F' and F², of which the branch pipe F' is provided with a valve or damper F³ and connects by a cross F⁴ with the discharge pipe G' of a blower G or like device, for furnishing the compressed air needed in the production of the desired result. As shown in Figs. 1 and 2, the blower G is directly driven from the engine C, but this may be differently arranged. The cross F⁴ is connected by a pipe H', having a valve H², with a heater H of any approved construction, from which leads the branch pipe F², so that air forced by the blower G through the pipe G', cross F⁴ and pipe H' into the heater H is heated in the latter and passed in this heated condition through the pipes F² and F into the air chamber E. An air inlet pipe I, having a valve or damper I', also connects with the cross F⁴, and through this pipe I the air from the compressor may be discharged when the valves H² and F³ are closed and the valve I' is open. The valve F³ may be opened so that a portion of the air from the blower G passes through the pipe F', to mix with the heated air coming by the branch pipe F² from the heater H, to reduce the temperature of the air passing into the air chamber E. Thus by the operator manipulating the valves H² and F³, heated air to the desired degree may be passed into the air chamber E.

In order to heat the milk contained in the vessel A during a portion of the process, a heating coil J is provided and removably held in the vessel A, above the stirrer or agitator B, as illustrated in the drawings. The heating coil J consists essentially of two heads J' and J², connected with each other by circulating pipes J³, and the said heads J' and J² are adapted to rest on lugs or other supports A³, fixed in the vessel A, as shown in Figs. 1 and 2. The head J' is provided with a lengthwise partition J⁴ (see Fig. 3), to divide the said head into an inlet chamber J⁵ and an outlet chamber J⁶, and the said chambers are normally closed by self-closing valves K and K', having their stems mounted to slide in guideways J⁷, formed in the head J', the stems being pressed on by springs K², so as to hold the valves normally to their seats K³ and K⁴, formed in the outer wall of the head J'. The valves K and K' are adapted to be opened after the coil J is placed in position in the vessel A by the use of plungers or screw rods L and L', under the control of the operator and extending lengthwise through valves O and O', controlling valve seats N² and N³ in steam inlet chambers N and N' respectively, of which the steam inlet chamber N is connected with the exhaust steam pipe C' of the engine C, but the said chamber N may be connected with another source of steam supply. The chambers N and N' are bolted or otherwise secured to the end of the vessel A and the valves O and O' are in alinement with the valves K and K', as plainly shown in Fig. 3.

The chambers N and N' are provided with inwardly extending annular flanges N⁴ and N⁵, fitting into annular grooves J⁸ and J⁹, formed on the outside of the head J', the said flanges N⁴, N⁵ and their grooves J⁸, J⁹ being concentric with the valve seats K³ and K⁴ and their valves K and K'. In order to insure a firm connection between the flanges N⁴ and N⁵ and their grooves J⁸, J⁹, a screw rod P is provided, screwing in a nut P', held in the other end of the vessel A, as plainly shown in Fig. 3, and this screw rod P screws against the head J², so as to allow of pushing the entire coil J rearwardly, to engage the grooves J⁸, J⁹ with the annular flanges N⁴, N⁵. Now when the several parts are in this position (see Fig. 3), and the plungers L and L' are screwed inward by the operator turning the handles L² and L³ of the said plungers, then the valves K and K' are moved off their seats K³ and K⁴, against the tension of their springs K². The valve stems O², O³ of the valves O and O' are mounted to screw in the threaded heads N⁷, N⁸ of the chambers N and N', and on the outer ends of the said stems O², O³ are arranged handles O⁴, O⁵, adapted to be taken hold of by the operator, to turn the valves O and O', so as to move the same off or onto their seats. Now when it is desired to allow the steam to circulate through the coil J, then the valves K and K' are first opened, as above described, after the coil J is in proper position, as shown in Fig. 3, and then the valves O and O' are opened, so that the steam now passes through the pipe C' into the chamber N, and from the latter through the open valve seat N² and the annular flange N⁴ and valve seat K³, into the chamber J⁵, from which the steam circulates by its pipes J³ into the head J², and from the latter back by its pipes J³, opening into the chamber J⁶. The steam can now escape from the latter chamber by way of the open valve seat K′, the flange N⁵ and the open valve seat N³, into the exhaust chamber N′, from which the steam can escape by the pipe N⁶ to a suitable place of discharge. The coil J is kept in the vessel A and immersed in the milk until the latter has reached a thick milk consistency, and when this takes place the operator closes the valve C² in the exhaust pipe C′, to shut off the steam from the chamber N, and then the operator closes the valves O and O′ and retracts the plungers L and L′, to allow the springs K to move the valves K and K′ onto their seats K³ and K⁴, to close the chambers J⁵ and J⁶. When this has been done the operator retracts the screw rod P, to allow shifting the coil J forwardly, to disengage the annular flanges N⁴, N⁵ from the grooves J⁸, J⁹.

In order to lower the coil J into the vessel A or to lift it out of the same, the said coil is attached at or near its middle with a cable Q, forming part of a hoisting device of any improved construction, to allow of lowering the coil J into position on the supports A³, for connecting the coil with the steam supply, as above described, and to allow of hoisting the coil J out of the vessel A after the coil is disconnected from the steam supply. Now during the operation described, the milk in the vessel is not liable to pass into the coil or out of the vessel by way of the steam inlet and at the valves O and O′.

The exhaust steam pipe C′ of the engine C is provided with a branch pipe C³, having a valve C⁴, which is normally closed, but is opened before the valve C² is closed, as above explained, to allow the exhaust steam to pass through the branch pipe C³ to the outer air.

In order to keep the induction port A² free from any particles of the milk liable to clog the said induction port, a wiper or valve R is provided, extending the length of the port and loosely mounted on the crank arm R′ of the rock shaft R², extending lengthwise in the chamber E and passing through stuffing boxes in the heads of the chamber to the outside thereof, and on one outer end of this rock shaft R² is secured a handle R³, under the control of the operator, to permit the latter to impart a rocking motion to the shaft R², to move the wiper R up or down in the induction port A², to clean the same of any solid matter that may pass into the port or adhere to the walls thereof. Furthermore, the wiper R may serve as a valve to partially close the port whenever it is desired to increase the air pressure. The wiper R may also be used to completely close the port, to retain the milk product within the vessel A, in case the air is shut off from the chamber E.

A strainer S is placed in the air supply pipe F, to prevent any impurities from being carried along by the air into the air chamber E and the milk contained in the vessel A.

In order to allow convenient removal of the finished product from the vessel A, the air chamber E is provided with an air-tight door T which, when opened after the air blast is shut off and the stirrer B ceases its rotation, allow the finished product to drop through the induction port A² into the air chamber E, and through the open door T into a receiving receptacle.

The operation is as follows: The milk is poured into the vessel A while the air blast is turned on and the stirrer B is rotating and the coil J is in position in the vessel, and, by the action of the agitator or breaker B, the milk and the entering air are agitated, to insure a very intimate intercommingling of the heated air and the milk, which latter at the same time is heated by the coil J immersed in the milk. The air is passed into the milk at about a temperature of 216° F., and this is maintained during about three-fifths of the whole time required for obtaining the product, and during this first period of the process the milk is concentrated to a thick milk consistency, and notwithstanding the high temperature of the introduced air, solubility of the solids of the milk, such as the casein or other albuminous matter, is not practically lessened. During the next period, the heating medium (coil) is bodily removed, and the milk is now reduced to a doughy consistency, and the air is introduced during this period at a temperature of about 190° F., and the period lasts about one-fifth of the whole time of the process. From this doughy state of the milk, until the latter crumbles, the temperature of the heated air is kept at 190° and the state of crumbling is reached in about one-tenth of the time of the whole process, and from this stage until the finished product is obtained, the heated air is passed into the milk at 170° F., and this last stage of the process takes about one-tenth of the time of the whole process. At the end of the last period of the process, the heated air is shut off and the stirrer is stopped, to allow of removing the product from the vessel, as previously explained, the product being now in condition for the market.

It will be seen that in my process, the milk is wholly superimposed to the entering heated air and that, therefore, the heated air enters the milk during the whole process at the most effective point. And, besides, it is entered over the whole length of the milk and immediately broken and thoroughly diffused in the whole body of the milk by the smasher, and the evaporation is expedited thereby and the solubility of the product improved. By entering the air at the bottom I avoid the baking and consequent injury of the product that occurs on pipes that convey heated air to the product downwardly inside of the tank, or that contact with the product at all; besides, air so entered is localized and less effective in preventing fermentation and less economic in drying than by my practice of immediate mechanical subdivision and diffusion of the whole volume of the heater air with the whole body of the milk.

From the foregoing it is evident that only a concentration tank whose contacting portion with the peripheral sweep of the stirrer is circular, and whose end or ends are also in sweeping contact with the end of the stirrer, will suffice, with the other means described, to prevent, as far as practicable, the dormancy in the product that would occur in any other form of tank, or dormancy of the product due to wrong formation of tank.

In one tank (see Fig. 4) may be a series of circular bottoms and breakers with the additional useful features described and the spokes of each breaker may operate between the spokes of its neighbor and so dislodge from each any possible dormant portions of the product thereon; besides, the scraping, breaking and grinding effect of the radial spokes of the breakers passing each other, first on the semi-solid, second on the doughy and last on the crumbly, almost dry, product will further prevent dormancy and consequent souring of the product, and cause a finer subdivision and more rapid drying and finish. But my simple illustration of the concentrating tank with one circular bottom, one breaker, intercepters and one air port explains my process clearly.

In the application of heat and air in reducing milk by evaporation to a dry solid, I find that continuous rapid mechanical stirring and smashing of the whole body of the milk by the mechanical stirrer presents a very large surface to the vapor absorbing air, as it is introduced to the milk in my apparatus, to act upon, and this in a greater degree when the milk does thicken and rapid drying is most required; and when the milk has reached a doughy density, which condition maintains but a fraction of the whole time required for the process, the mechanical smasher rapidly subdivides it, incessantly exposing new surfaces to the heated vapor absorbing air, that in my process strikes the product in its lowermost portion over the whole length of the tank, until it is crumbly dry, then smashed to granules and powder and stirred and dried by heated air entering the product over its whole length at the most effective point, till dry, fit for grinding; thus continuously, without cessation, producing at every stage of the process new and finely subdivided surfaces of the product for the efficiently diffused heated vapor absorbing air to act upon, and, practically, preventing dormancy and fermentation of the whole product, and thereby producing a product that, reconstructed milk therefrom is more akin to natural milk in taste, color, rennet test, solubility and souring.

Although I have herein shown and described the improvement more particularly for treating milk, it is evident that other liquids and substances may be treated in the same manner with a view to produce dry solids.

The process and the product derived therefrom and herein described is not claimed in this application, but forms the subject-matter of separate applications.

Having thus described my invention, I claim as new and desire to secure by Letters Patent:—

1. An apparatus for drying milk, comprising a vessel for containing the milk and having an open top and a bottom semi-circular in cross section, the said bottom being provided with an air induction slot extending throughout the length of the bottom, an agitator in the bottom portion of the vessel sweeping the surface of the bottom portion, and an air supply connected with the said slot, for forcing a blast of compressed air through the slot into the milk, as set forth.

2. An apparatus for drying milk, comprising a vessel for containing the milk and having an open top and a bottom semi-circular in cross section, the said bottom being provided with an air induction slot extending throughout the length of the bottom, an agitator in the bottom portion of the vessel, an air supply connected with the said slot, for forcing a blast of compressed air through the slot into the milk, and a removable and replaceable heating coil wholly immersed in the milk above the said agitator, as set forth.

3. An apparatus for drying milk, comprising a vessel for containing the milk and having an open top and a bottom semi-circular in cross section, the said bottom being provided with an air induction slot extending throughout the length of the bottom, an agitator in the bottom portion of the vessel, an air supply connected with the said slot, for forcing a blast of compressed air through the slot into the milk, a heating coil removable and replaceable while wholly immersed in the milk, above the said agitator, and means for preventing the milk from entering the coil on removing or replacing it, as set forth.

4. An apparatus for drying milk, comprising a vessel for containing the milk and having an open top and a bottom semi-circular in cross section, the said bottom being provided with an air induction slot extending throughout the length of the bottom, an agitator in the bottom portion of the vessel, an air supply connected with the said slot, for forcing a blast of compressed air through the slot into the milk, and a manually controlled wiper for clearing the said slot, as set forth.

5. An apparatus for drying milk, comprising a vessel for containing the milk and having an open top and a bottom semi-circular in cross section, the said bottom being provided with an air induction slot extending throughout the length of the bottom, an agitator in the bottom portion of the vessel, an air supply connected with the said slot, for forcing a blast of compressed air through the slot into the milk, and a manually controlled wiper for clearing the said slot, the said wiper being located within the air supply and having operating means extending to the outside of the said air supply, as set forth.

6. An apparatus for drying milk, provided with a vessel for containing milk, open at the top, a coil completely immersed in the milk and held in the said vessel, means for connecting the said coil with a heating medium supply, and means for closing the coil, to prevent the milk from entering the coil when disconnected from the said supply while submerged and while being lifted out of the vessel, as set forth.

7. An apparatus for drying milk, provided with a vessel for containing milk, open at the top, a coil removably held in the said vessel, completely submerged in the milk, the said coil comprising spaced heads, pipes connecting the heads with each other for circulating the heating medium through the coil, means on the vessel for connecting one of the heads with a heating medium supply, and self-closing valves on the coil, for automatically closing the latter to prevent the milk from entering the coil when disconnected from the said supply and while being lifted out of the vessel, as set forth.

8. An apparatus for drying milk provided with a vessel, and a heating coil removably held in the said vessel and comprising heads, of which one is provided with an inlet chamber and an outlet chamber, pipes connecting the heads with each other for circulating the heating medium through the coil, self-closing inlet and outlet valves in the said chambers, admission and exhaust valves on the said vessel and in alinement with the said chamber valves, and manually controlled means for opening the said chamber valves, to allow of establishing communication between the admission and exhaust valves and the said chambers, as set forth.

9. An apparatus for drying milk, provided with a vessel, and a heating coil removably held in the said vessel and comprising heads, of which one is provided with an inlet chamber and an outlet chamber, pipes connecting the heads with each other for circulating the heating medium through the coil, self-closing inlet and outlet valves in the said chambers, admission and exhaust valves on the said vessel, in alinement with the said chamber valves, and manually controlled means for opening the said chamber valves, to allow of establishing communication between the admission and exhaust valves and the said chambers, the said means consisting of plungers movable lengthwise in the said admission and exhaust valves, as set forth.

10. An apparatus for drying milk, provided with a vessel for containing the milk, open at the top, the bottom of the vessel being semi-circular in cross section and provided with a slot extending throughout the length of the said bottom, for the entrance of air, an agitator in the bottom portion of the vessel, sweeping the surface of the bottom portion, a heating coil in the upper portion of the vessel, above the said agitator and wholly submerged in the milk, means for connecting the said coil with a heating medium supply, and means for closing the coil, to prevent the milk from entering the coil while being lifted out of the vessel, as set forth.

11. An apparatus for drying milk, provided with a vessel for containing the milk, open at the top, the bottom of the vessel being semi-circular in cross section and provided with a slot extending throughout the length of the bottom, an air chamber on the outside of the said bottom, to which the milk and its product are directly exposed and superimposed by way of the said slot, and means for producing an air blast and connected with the said air chamber, as set forth.

12. An apparatus for drying milk, provided with a vessel for containing the milk, open at the top, the bottom of the vessel being semi-circular in cross section and provided with a slot extending throughout the length of the bottom, an air chamber on the outside of the said bottom, to which the milk and its product are directly exposed and superimposed by way of the said slot, means for producing an air blast connected with the said chamber, a wiper for the said slot, and manually controlled means for actuating the said wiper from the outside of the said air chamber, as set forth.

13. An apparatus for drying milk, provided with a vessel for containing the milk, open at the top, the bottom of the vessel being semi-circular in cross section and provided with a slot extending throughout the length of the bottom, an air chamber on the outside of the said bottom, to which the milk and its product are directly exposed and superimposed by way of the said slot, means for producing an air blast connected with the said chamber, a wiper for the said slot, manually controlled means for actuating the said wiper from the outside of the said air chamber, an agitator in the bottom portion of the said vessel, provided with radial arms, and means for imparting a vibrating motion to the agitator in the direction of its axis, as set forth.

14. An apparatus for drying milk, provided with a vessel for containing the milk, open at the top, the bottom of the vessel being semi-circular in cross section and provided with a slot extending throughout the length of the bottom, an air chamber on the outside of the said bottom, to which the milk and its product are directly exposed and superimposed by way of the said slot, means for producing an air blast connected with the said chamber, a wiper for the said slot, manually controlled means for actuating the said wiper from the outside of the said air chamber, an agitator in the bottom portion of the said vessel, provided with radial arms, means for imparting a vibrating motion to the agitator in the direction of its axis, and scraper rods fixed in the vessel, between the radial arms of the said agitator, as set forth.

15. An apparatus for drying milk, provided with a vessel for containing the milk, open at the top, the vessel having a bottom semi-circular in cross section and provided with an air induction slot extending throughout the length of the said bottom for the entrance of an air blast, and means for producing the air blast, as set forth.

16. An apparatus for drying milk, provided with a vessel for containing the milk, open at the top, the bottom of the vessel being semi-circular in cross section and provided with a slot extending throughout the length of the said bottom for the entrance of an air blast, means for producing the air blast, an agitator in the bottom portion of the vessel, sweeping the surface of the bottom portion, the agitator having radial arms, and fixed scraper rods in the said vessel, between the radial arms of the agitator, as set forth.

17. An apparatus for drying milk, provided with an open vessel having an air induction slot extending throughout the length of the bottom of the said vessel for the entrance of an air blast, and means for producing the air blast.

18. An apparatus for drying milk provided with a vessel having an air induction slot extending throughout the length of the bottom of the said vessel for the entrance of an air blast, an air chamber on the outside of the said bottom, to which the milk and its product are directly exposed and superimposed by way of the said slot, and means for producing an air blast and connected with the said air chamber.

19. An apparatus for drying milk, provided with an open vessel having an air induction slot extending throughout the length of the bottom of the said vessel for the entrance of an air blast, an agitator in the said vessel, and means for producing the air blast.

20. An apparatus for drying milk provided with a vessel having an air induction slot extending throughout the length of the bottom of the said vessel for the entrance of an air blast, an air chamber on the outside of the said bottom, to which the milk and its product are directly exposed and superimposed by way of the said slot, a manually controlled wiper for clearing the said slot, and means for producing an air blast and connected with the said air chamber.

21. An apparatus for drying milk provided with a vessel having an air induction slot extending throughout the length of the bottom of the said vessel for the entrance of an air blast, an air chamber on the outside of the said bottom to which the milk and its product are directly exposed and superimposed by way of the said slot, a manually controlled wiper for clearing the said slot, the wiper being located within the air supply and having operating means extending to the outside of the said air chamber, and means for producing an air blast and connected with the said air chamber.

In testimony whereof I have signed my name to this specification in the presence of two subscribing witnesses.

JOHN McINTYRE.

Witnesses:
 THEO. G. HOSTER,
 EVERARD B. MARSHALL.

---

Copies of this patent may be obtained for five cents each, by addressing the "Commissioner of Patents Washington, D. C."